United States Patent
Seo et al.

(10) Patent No.: US 9,205,742 B2
(45) Date of Patent: Dec. 8, 2015

(54) APPARATUS AND METHOD FOR CORRECTING OFFSET OF YAW RATE SENSOR AND SYSTEM FOR CONTROLLING SPEED OF VEHICLE WITH THE SAID APPARATUS

(71) Applicant: HYUNDAI MOBIS CO., LTD., Seoul (KR)

(72) Inventors: Kyung Il Seo, Yongin-si (KR); Jang Mo Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/082,459

(22) Filed: Nov. 18, 2013

(65) Prior Publication Data

US 2015/0025771 A1    Jan. 22, 2015

(30) Foreign Application Priority Data

Jul. 19, 2013    (KR) ........................ 10-2013-0085154

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| B60K 31/00 | (2006.01) |
| B60W 50/00 | (2006.01) |
| B60W 30/16 | (2012.01) |
| G01C 25/00 | (2006.01) |

(52) U.S. Cl.
CPC ............ *B60K 31/0008* (2013.01); *B60W 30/16* (2013.01); *B60W 50/0098* (2013.01); *G01C 25/005* (2013.01); *B60W 2050/0049* (2013.01); *B60W 2050/0088* (2013.01); *B60W 2520/10* (2013.01); *B60W 2520/125* (2013.01); *B60W 2520/14* (2013.01)

(58) Field of Classification Search
CPC ................ B60W 2550/143; B60W 2720/106; B60W 30/16; B60T 7/22; B60K 31/0008
USPC ........................................................ 701/96
See application file for complete search history.

(56) References Cited

U.S. PATENT DOCUMENTS

| | | | |
|---|---|---|---|
| 5,857,160 A   * | 1/1999 | Dickinson et al. .............. 701/41 |
| 2002/0138192 A1* | 9/2002 | Lueder et al. ................... 701/93 |
| 2003/0156015 A1 | 8/2003 | Winner et al. |
| 2006/0021433 A1 | 2/2006 | Willig et al. |
| 2011/0295549 A1 | 12/2011 | Takabayashi et al. |
| 2012/0089297 A1* | 4/2012 | Shimizu ...................... 701/29.7 |

FOREIGN PATENT DOCUMENTS

| DE | 10 2004 026 972 A1 | 12/2005 |
|---|---|---|
| EP | 2 082 940 A1 | 7/2009 |
| JP | 11-125532 A | 5/1999 |
| KR | 10-2004-0040155 A | 5/2004 |
| KR | 10-2005-0046240 A | 5/2005 |
| KR | 10-2007-0060512 A | 6/2007 |
| KR | 10-2007-0105130 A | 10/2007 |
| KR | 10-2008-0022374 A | 3/2008 |

OTHER PUBLICATIONS

Extended European Search Report issued on Mar. 25, 2015, in counterpart European Application No. 13192970.5 (6 pages, in English).

* cited by examiner

*Primary Examiner* — Maceeh Anwari
(74) *Attorney, Agent, or Firm* — NSIP Law

(57) ABSTRACT

The present invention suggests an offset correcting apparatus of a yaw rate sensor which corrects an offset of a yaw sensor in accordance with a status of a vehicle in a cruise control system, a method thereof, and a vehicle speed control system including the apparatus.

14 Claims, 8 Drawing Sheets

APPARATUS AND METHOD FOR CORRECTING OFFSET OF YAW RATE SENSOR AND SYSTEM FOR CONTROLLING SPEED OF VEHICLE WITH THE SAID APPARATUS

CROSS-REFERENCE TO RELATED APPLICATIONS

This application claims priority to and the benefit of Korean Patent Application No. 10-2013-0085154 filed in the Korean Intellectual Property Office on Jul. 19, 2013, the entire contents of which are incorporated herein by reference.

TECHNICAL FIELD

The present invention relates to an apparatus and a method for correcting an offset of a yaw rate sensor which is installed in a vehicle. The present invention relates to a system for controlling a speed of a vehicle which may be implemented by a smart cruise control (SCC) system or an adaptive cruise control (ACC) system.

BACKGROUND ART

A cruise control system refers to a system which uses various sensors such as a millimeter wave radar, a laser radar, or a vision sensor to track a preceding vehicle. Examples of the cruise control system include a smart cruise control system and an adaptive cruise control system.

The cruise control system uses information on a vehicle to be controlled and information on surrounding vehicles to estimate a heading direction of the vehicle to be controlled and determine a vehicle to be tracked. The function of the cruise control system is a very important factor for securing safety of the vehicle.

A method for estimating the heading direction of the vehicle varies depending on a control concept. Generally, a method which uses a steering angle signal, a method which uses a yaw rate signal, and a method which uses a lateral acceleration are representative.

According to the method which uses the steering angle signal, accuracy is lowered when the vehicle is being driven at a high speed. According to the method which uses the lateral acceleration signal, an accuracy is lowered when the vehicle is being driven at a low speed or passes a slope way. Accordingly, a method which uses the yaw rate signal which shows stable performance regardless of the speed of the vehicle is widely used.

In the method which uses the yaw rate signal, an accuracy of a yaw rate sensor significantly influences precise estimation of a heading direction of the vehicle. However, when the vehicle is being driven at a low speed, a value of the yaw rate sensor is significantly changed due to very tiny movement and the yaw rate sensor is very sensitive to a noise. Even though an electronic stability control (ESC) device corrects an offset of the yaw rate sensor, a precision required for the SCC system is very high so that a corrected value of the ESC device may not satisfy a SCC requirement performance. In the case of a yaw rate sensor to which an MEMS technique is applied, the offset varies depending on a temperature.

Korean Unexamined Patent Application Publication No. 2007-0060512 suggests a method for calculating an offset error of a yaw rate sensor to determine a trouble. However, even when the method is used, if the performance is deteriorated due to the temperature or the performance is temporarily lowered due to a noise, the offset of the yaw rate sensor cannot be corrected.

SUMMARY OF THE INVENTION

The present invention has been made in an effort to provide an apparatus and a method for correcting an offset of a yaw rate sensor which corrects an offset of a yaw rate sensor in accordance with a status of a vehicle in a cruise control system and a vehicle speed control system which includes the apparatus.

However, an object of the present invention is not limited to the above description and other objects which have not been mentioned above will be more apparent to those skilled in the art from reading the following description.

An exemplary embodiment of the present invention provides an offset correcting apparatus of a yaw rate sensor including a current status determining unit which determines a status of its own vehicle as one of a driving vehicle and a stopped vehicle; a first offset correcting unit which if its own vehicle is determined as the driving vehicle, when its own vehicle is being driven in a straight line, corrects an offset of a yaw rate sensor which is installed in its own vehicle; and a second offset correcting unit which if its own vehicle is determined as the stopped vehicle, when a position of its own vehicle is not changed, corrects the offset of the yaw rate sensor.

The first offset correcting unit may include: a straight drive determining unit which determines whether its own vehicle is being driven in a straight line using a sensor which is installed in its own vehicle; a yaw rate estimating unit which if it is determined that its own vehicle is being driven in a straight line, estimates a first yaw rate using a longitudinal speed of its own vehicle and a lateral acceleration of its own vehicle; a yaw rate measuring unit which if it is determined that its own vehicle is being driven in a straight line, measures a second yaw rate using the yaw rate sensor; and a first yaw rate offset correcting unit which corrects the offset of the yaw rate sensor using a difference value between the first yaw rate and the second yaw rate.

The straight drive determining unit may use at least one selected from a radar sensor, a G sensor, and a steering angle sensor as a sensor which is installed in its own vehicle. If the radar sensor is used to determine that distances to stopped targets which are aligned in a driving direction of its own direction are constant, the straight drive determining unit may determine that its own vehicle is being driven in a straight line, if it is determined that the absolute value of the lateral acceleration obtained using the G sensor is equal to or smaller than a first reference value, the straight drive determining unit may determine that its own vehicle is being driven in a straight line, or if it is determined that the steering angle obtained using the steering angle sensor is equal to or smaller than a second reference value, the straight drive determining unit may determine that its own vehicle is being driven in a straight line.

If a difference value between the first yaw rate and the second yaw rate is equal to or larger than a third reference value, the first yaw rate offset correcting unit may correct the offset of the yaw rate sensor using the difference value between the first yaw rate and the second yaw rate.

The second offset correcting unit may include: a position change determining unit which determines whether a position of its own vehicle is changed for a predetermined time; and a second yaw rate offset correcting unit which if it is determined that the position of its own vehicle is not changed, corrects the offset of the yaw rate sensor based on a bias voltage which is applied to the equipment which is installed in its own vehicle.

The position change determining unit may use a radar sensor or an angular velocity sensor when determining whether the position of its own vehicle is changed.

If the radar sensor is used to determine that the distance to a designated target which does not move is changed, the position change determining unit may determine that the position of its own vehicle is changed or if the angular velocity sensor is used to determine that a position of equipment which is installed in its own vehicle is changed, the position change determining unit may determine that the position of its own vehicle is changed.

The current status determining unit may include a speed measuring unit which measures a speed of its own vehicle and a speed utilizing unit which if the speed of its own vehicle is larger than zero, determines its own vehicle as the driving vehicle and if the speed of its own vehicle is zero, determine its own vehicle as the stopped vehicle.

Another exemplary embodiment of the present invention provides an offset correcting method of a yaw rate sensor, including: determining a status of its own vehicle as one of a driving vehicle and a stopped vehicle; and if its own vehicle is determined as the driving vehicle, correcting an offset of a yaw rate sensor which is installed in its own vehicle when its own vehicle is being driven in a straight line and if its own vehicle is determined as the stopped vehicle, correcting the offset of the yaw rate sensor when a position of its own vehicle is not changed.

The correcting of an offset when its own vehicle is determined as the driving vehicle, may include determining whether its own vehicle is being driven in a straight line using a sensor which is installed in its own vehicle; estimating a first yaw rate using a longitudinal speed of its own vehicle and a lateral acceleration of its own vehicle if it is determined that its own vehicle is being driven in a straight line; measuring a second yaw rate using the yaw rate sensor if it is determined that its own vehicle is being driven in a straight line; and correcting the offset of the yaw rate sensor using a difference value between the first yaw rate and the second yaw rate.

The determining of whether its own vehicle is being driven in a straight line may use at least one selected from a radar sensor, a G sensor, and a steering angle sensor as a sensor which is installed in its own vehicle.

The determining of whether its own vehicle is being driven in a straight line may include, determining that its own vehicle is being driven in a straight line if the radar sensor is used to determine that distances to stopped targets which are aligned in a driving direction of its own direction are constant, determining that its own vehicle is being driven in a straight line if it is determined that the absolute value of the lateral acceleration obtained using the G sensor is equal to or smaller than a first reference value, or determining that its own vehicle is being driven in a straight line if it is determined that the steering angle obtained using the steering angle sensor is equal to or smaller than a second reference value.

When a difference value between the first yaw rate and the second yaw rate is equal to or larger than a third reference value, the correcting using the difference value may include correcting the offset of the yaw rate sensor using the difference value between the first yaw rate and the second yaw rate.

The correcting of an offset when its own vehicle is determined as the driving vehicle, may include: determining whether a position of its own vehicle is changed for a predetermined time; and correcting the offset of the yaw rate sensor based on a bias voltage which is applied to the equipment which is installed in its own vehicle if it is determined that the position of its own vehicle is not changed.

The determining of whether a position of its own vehicle is changed may use a radar sensor or an angular velocity sensor when determining whether the position of its own vehicle is changed.

The determining of whether a position of its own vehicle is changed may include determining that the position of its own vehicle is changed if the radar sensor is used to determine that the distance to a designated target which does not move is changed, or determining that the position of its own vehicle is changed if the angular velocity sensor is used to determine that a position of equipment which is installed in its own vehicle is changed.

The determining of a status of its own vehicle as one of a driving vehicle and a stopped vehicle may include: measuring a speed of its own vehicle; and if the speed of its own vehicle is larger than zero, determining its own vehicle as the driving vehicle and if the speed of its own vehicle is zero, determining its own vehicle as the stopped vehicle.

Yet another exemplary embodiment of the present invention provides a vehicle speed control system, comprising: an offset correcting apparatus which includes: a current status determining unit which determines a status of its own vehicle as one of a driving vehicle and a stopped vehicle, a first offset correcting unit which if its own vehicle is determined as the driving vehicle, when its own vehicle is being driven in a straight line, corrects an offset of a yaw rate sensor which is installed in its own vehicle, and a second offset correcting unit which if its own vehicle is determined as the stopped vehicle, when a position of its own vehicle is not changed, corrects the offset of the yaw rate sensor; a curvature radius estimating device which estimates a radius of curvature of its own vehicle based on the offset of the yaw rate sensor; and a vehicle speed control device which controls a speed of its own vehicle based on sensing information obtained from sensors which are installed in its own vehicle and the radius of curvature of its own vehicle.

The vehicle speed control device may include: a first sensing unit which senses object information related with objects which are present around its own vehicle; a second sensing unit which senses driving information related with the driving of its own vehicle; a preceding vehicle detecting unit which detects a preceding vehicle to be tracked by combining object information and driving information; a target acceleration calculating unit which calculates a target acceleration based on a distance to the preceding vehicle and a speed of its own vehicle; and a vehicle speed adjusting unit which controls an accelerator and a decelerator of its own vehicle based on the target acceleration to adjust a speed of its own vehicle.

According to the present invention, the following effects may be achieved:

First, even when a performance of a yaw rate sensor is lowered, a performance for selecting a target vehicle is secured by self-correction to improve an SCC control performance and safety.

Second, the above-mentioned object may be achieved by correcting only a logic in the existing system so that the process may be simplified.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
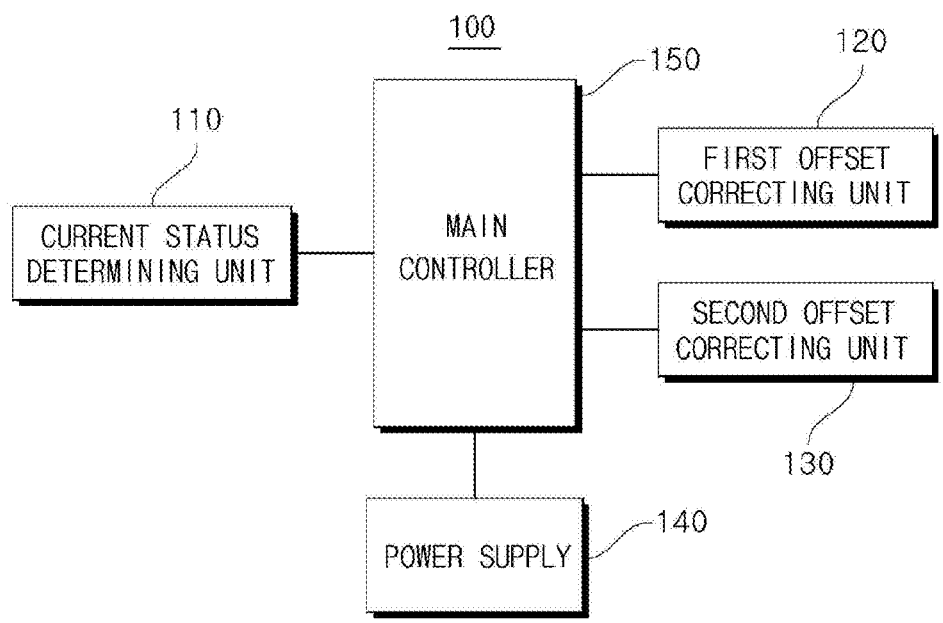
FIG. 1 is a block diagram schematically illustrating an offset correcting apparatus of a yaw rate sensor according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the exemplary embodiment according to the present invention will be described in detail with reference to the accompanying drawings. In the figures, even though the parts are illustrated in different drawings, it should be understood that like reference numbers refer to the same or equivalent parts of the present invention throughout the several figures of the drawing. When it is judged that specific description on known configurations or functions related in the description of the present invention may unnecessarily obscure the essentials of the present invention, the detailed description will be omitted. Hereinafter, exemplary embodiments of the present invention will be described. However, it should be understood that a technical spirit of the invention is not limited to the specific embodiments, but may be changed or modified in various ways by those skilled in the art.

FIG. 1 is a block diagram schematically illustrating an offset correcting apparatus of a yaw rate sensor according to an exemplary embodiment of the present invention.

Referring to FIG. 1, an offset correcting apparatus 100 of a yaw rate sensor includes a current status determining unit 110, a first offset correcting unit 120, a second offset correcting unit 130, a power supply 140, and a main controller 150. Hereinafter, it is described that the first offset correcting unit 120 and the second offset correcting unit 130 are distinguished depending on a current status of its own vehicle, but the first offset correcting unit 120 and the second offset correcting unit 130 may be combined to be operated.

Objects of the offset correcting apparatus 100 are to prevent erroneous control of a smart cruise control (SCC) system and improve a control performance. To this end, the offset correcting apparatus 100 periodically corrects an offset of the yaw rate sensor to prevent a performance of the yaw rate sensor due to deterioration or a noise from being lowered and further prevent a target selecting performance of the SCC system from being lowered.

When the vehicle is being driven, the offset correcting apparatus 100 corrects an offset of the yaw rate sensor using a speed, a lateral acceleration, and a steering angle. When the vehicle stops, the offset correcting apparatus 100 corrects the offset of the yaw rate sensor using a bias voltage which is supplied to various devices (for example, a battery) of the vehicle.

The offset correcting apparatus 100 uses a radar sensor to detect that the stopped vehicle is moved by a turn table of a parking garage so that the offset of the yaw rate sensor is prevented from being erroneously corrected.

The current status determining unit 110 determines the status of its own vehicle as one of a driving vehicle and a stopped vehicle.

Figure 4:
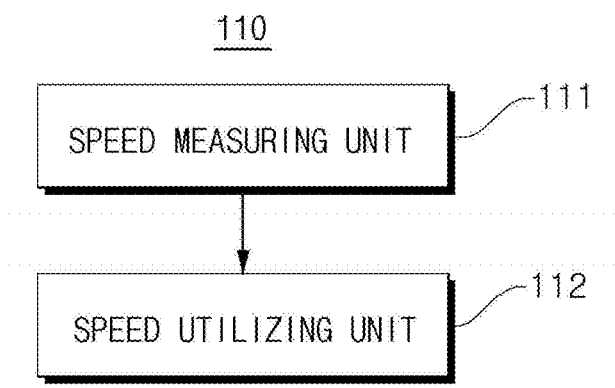
FIG. 4 is a block diagram illustrating a detailed configuration of a current status determining unit illustrated in FIG. 1.

The current status determining unit 110 may measure a speed of its own vehicle to determine the status of its own vehicle as one of a driving vehicle and a stopped vehicle. In this case, the current status determining unit 110 may include a speed measuring unit 111 and a speed utilizing unit 112, as illustrated in FIG. 4. FIG. 4 is a block diagram illustrating a detailed configuration of the current status determining unit illustrated in FIG. 1.

The speed measuring unit 111 measures a speed of its own vehicle.

The speed utilizing unit 112 compares the speed of its own vehicle with a reference value, zero and if the speed of its own vehicle is larger than zero, determines its own vehicle as a driving vehicle and if the speed of its own vehicle is zero, determines its own vehicle as a stopped vehicle.

Referring to FIG. 1, again, if its own vehicle is determined as a driving vehicle, the first offset correcting unit 120 determines whether its own vehicle is being driven in a straight line. If it is determined that its own vehicle is being driven in a straight line, the first offset correcting unit 120 corrects the offset of the yaw rate sensor which is installed in its own vehicle.

Figure 2:
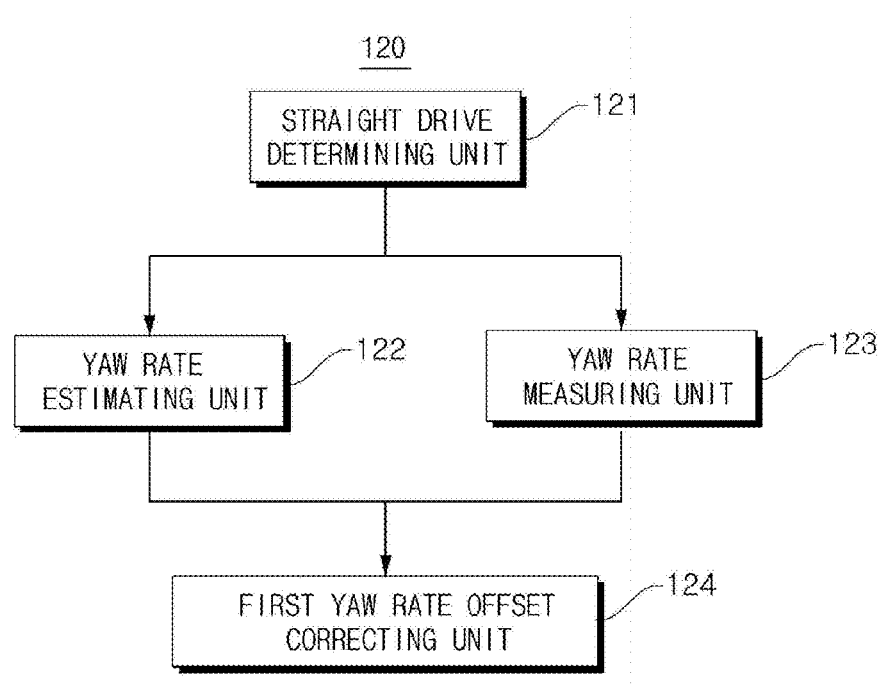
FIG. 2 is a block diagram illustrating a detailed configuration of a first offset correcting unit illustrated in FIG. 1.

When its own vehicle is the driving vehicle, the first offset correcting unit 120 may correct the offset of the yaw rate sensor using a longitudinal speed and a lateral acceleration of its own vehicle. In this case, the first offset correcting unit 120, as illustrated in FIG. 2, may include a straight drive determining unit 121, a yaw rate estimating unit 122, a yaw rate measuring unit 123, and a first yaw rate offset correcting unit 124. FIG. 2 is a block diagram illustrating a detailed configuration of the first offset correcting unit illustrated in FIG. 1.

The straight drive determining unit 121 determines whether its own vehicle is being driven in a straight line using a sensor which is installed in its own vehicle.

The straight drive determining unit 121 may use at least one selected from a radar sensor, a G sensor, and a steering angle sensor as a sensor which is installed in its own vehicle. Among the sensors, the G sensor (gravity sensor) is a sensor which detects the movement of its own vehicle using the gravity.

When the radar sensor is used, the straight drive determining unit 121 determines whether distances to stopped targets which are aligned in a driving direction of its own vehicle are constant and if it is determined that the distances to the stopped targets are constant, determines that its own vehicle is being driven in a straight line.

When the G sensor is used, the straight drive determining unit 121 obtains the lateral acceleration of its own vehicle and compares an absolute value of the lateral acceleration with a first reference value. If it is determined that the absolute value of the lateral acceleration is equal to or smaller than the first reference value, the straight drive determining unit 121 determines that its own vehicle is being driven in a straight line.

When the steering angle sensor is used, the straight drive determining unit 121 obtains a steering angle of its own vehicle and compares the steering angle with a second reference value. If it is determined that the steering angle is equal to or smaller than the second reference value, the straight drive determining unit 121 determines that its own vehicle is being driven in a straight line.

If it is determined that its own vehicle is being driven in a straight line, the yaw rate estimating unit 122 estimates a first yaw rate using the longitudinal speed of its own vehicle and the lateral acceleration of its own vehicle.

If it is determined that its own vehicle is being driven in a straight line, the yaw rate measuring unit 123 measures a second yaw rate using the yaw rate sensor.

The first yaw rate offset correcting unit 124 corrects the offset of the yaw rate sensor using a difference value between the first yaw rate and the second yaw rate.

The first yaw rate offset correcting unit 124 compares the difference value between the first yaw rate and the second yaw rate with a third reference value and if it is determined that the difference value is equal to or larger than the third reference value, corrects the offset of the yaw rate sensor using the difference value between the first yaw rate and the second yaw rate.

In the meantime, if it is determined that its own vehicle is not driving in a straight line, the first offset correcting unit 120 does not correct the offset of the yaw rate sensor.

Referring to FIG. 1, again, if it is determined that its own vehicle is the stopped vehicle, the second offset correcting unit 130 determines whether a position of its own vehicle is changed. If it is determined the position of its own vehicle is not changed, the second offset correcting unit 130 corrects the offset of the yaw rate sensor.

Figure 3:
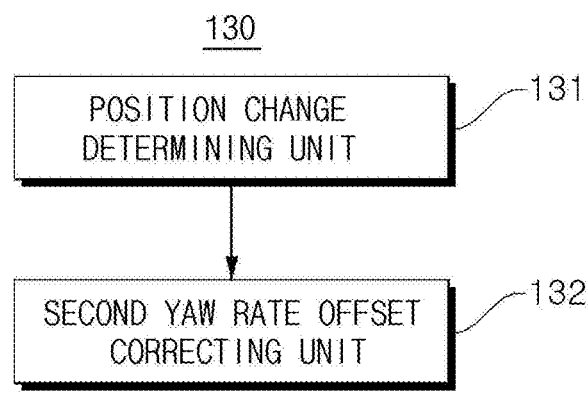
FIG. 3 is a block diagram illustrating a detailed configuration of a second offset correcting unit illustrated in FIG. 1.

The second offset correcting unit 130 may correct the offset of the yaw rate sensor using a bias voltage which is applied to equipment (for example, a battery) which is installed in its own vehicle. In this case, the second offset correcting unit 130, as illustrated in FIG. 3, may include a position change determining unit 131 and a second yaw rate offset correcting unit 132. FIG. 3 is a block diagram illustrating a detailed configuration of the second offset correcting unit illustrated in FIG. 1.

The position change determining unit 131 determines whether a position of its own vehicle is changed for a predetermined time.

The position change determining unit 131 may use the radar sensor or an angular velocity sensor when determining whether the position of its own vehicle is changed.

When the radar sensor is used, the position change determining unit 131 determines whether a distance to a designated target which does not move is changed. If it is determined that the distance to the designated target is changed, the position change determining unit 131 determines that the position of its own vehicle is changed.

When the angular velocity sensor is used, the position change determining unit 131 determines whether a position of the equipment which is installed in its own vehicle is changed. If it is determined that the position of the equipment is changed, the position change determining unit 131 determines that the position of its own vehicle is changed.

If it is determined that the position of its own vehicle is not changed, the second yaw rate offset correcting unit 132 corrects the offset of the yaw rate sensor based on the bias voltage which is applied to the equipment which is installed in its own vehicle.

In the meantime, if it is determines that the position of its own vehicle is changed, the second offset correcting unit 130 does not correct the offset of the yaw rate sensor.

The power supply 140 supplies a power to individual components of the offset correcting apparatus 100.

The main controller 150 controls the overall operation of individual components of the offset correcting apparatus 100.

The offset correcting apparatus 100 of the yaw rate sensor as described above distinguishes whether the vehicle is being driven or stops and corrects the offset of the yaw rate sensor by a method appropriate for each situation. Hereinafter, an offset correcting method for every situation will be described in detail.

Figure 5:
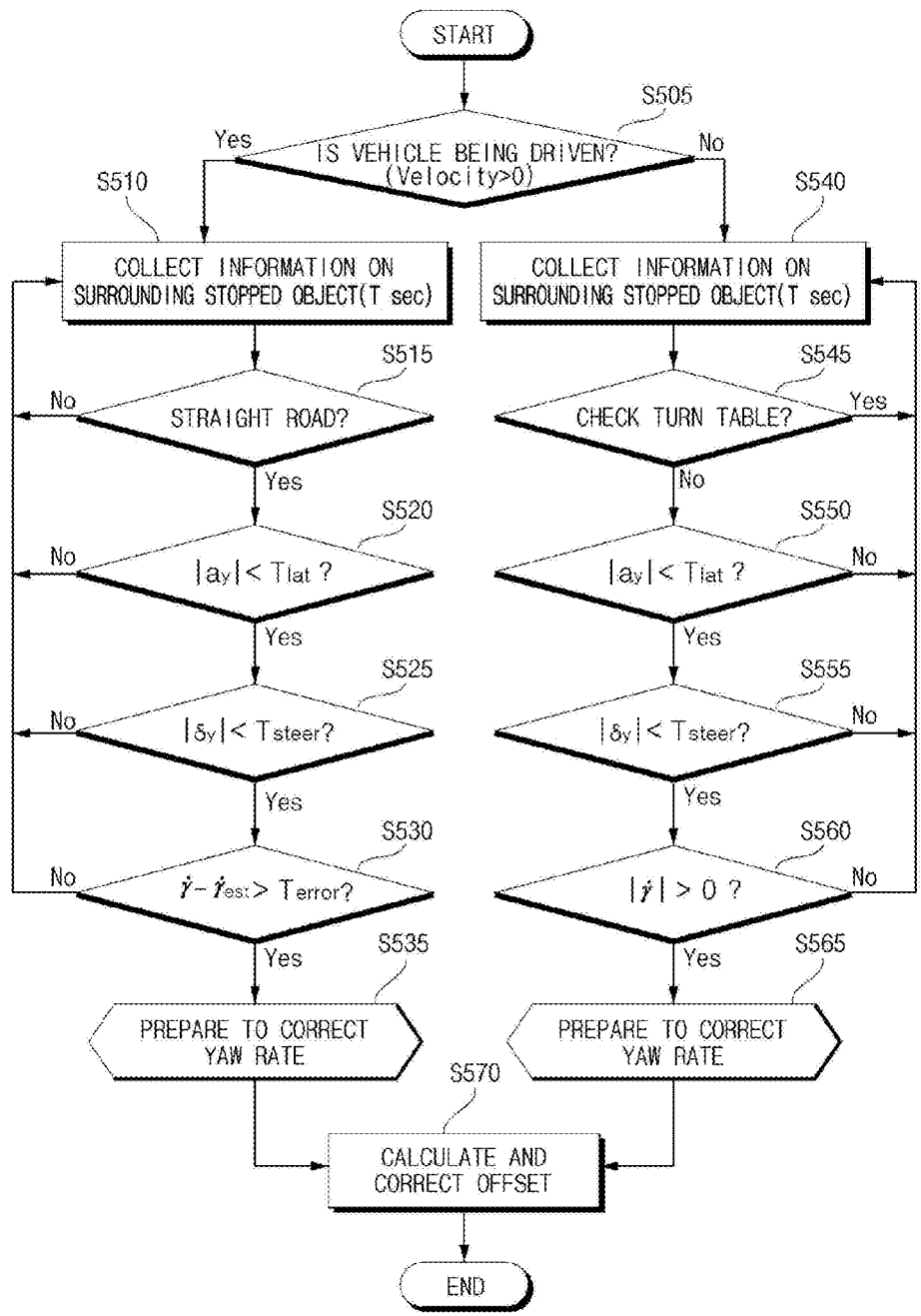
FIG. 5 is a flowchart illustrating an offset correcting method of a yaw rate sensor according to an exemplary embodiment of the present invention.
Figure 6:
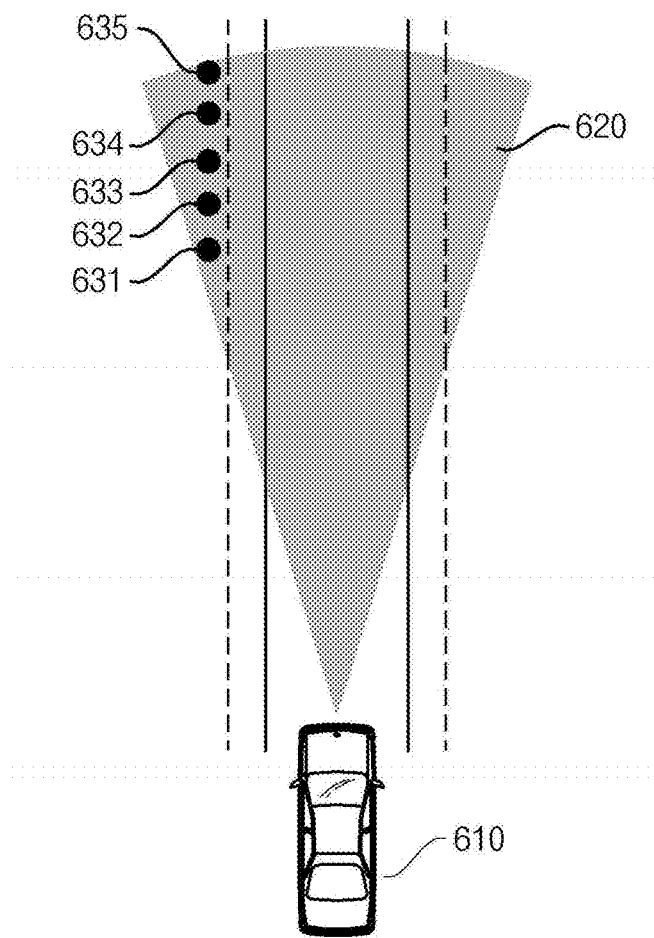
FIGS. 6 and 7 are reference diagrams illustrating an offset correcting method of a yaw rate sensor.
Figure 7:
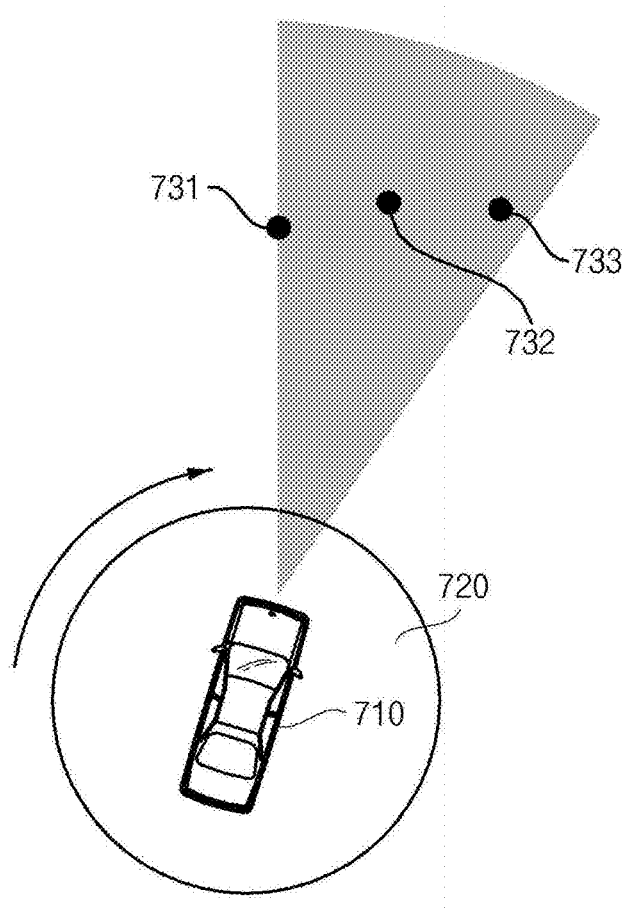

FIG. 5 is a flowchart illustrating an offset correcting method of a yaw rate sensor according to an exemplary embodiment of the present invention. FIGS. 6 and 7 are reference diagrams illustrating an offset correcting method of a yaw rate sensor.

First, in step S505, it is determined whether a vehicle is being driven based on a speed of the vehicle. If the vehicle is being driven, the speed of the vehicle is larger than zero and if the vehicle stops, the speed of the vehicle is zero.

When the vehicle is being driven, the offset of the yaw rate sensor is corrected using a residual between the sensors.

When the vehicle stops, it is difficult to correct the offset of the yaw rate sensor using a vehicle sensor. However, when a bias value is used, the offset of the yaw rate sensor is comparatively exactly corrected. However, even when the vehicle stops, a yaw value or a lateral acceleration $a_y$ is generated by the turn table, the offset may be erroneously corrected. Therefore, in this case, it is desirable to determine a situation of the vehicle using the radar sensor which is installed in the vehicle, first.

Hereinafter, it will be described in detail.

1) when vehicle is being driven (vehicle speed >0)

When the vehicle is being driven, if the yaw rate sensor is not in trouble, a normal value is output. However, a sensor installation axis may be twisted due to vehicle vibration or long-term driving or a drift offset may be generated due to an increased temperature inside or outside the sensor so that an error from an actual value may occur. Therefore, in this case, the vehicle sensor such as the radar sensor is used to determine whether the vehicle is being driven in a straight line and the residual between the sensors is used to correct the offset of the yaw rate sensor.

In step S510, first, the vehicle sensor such as the radar sensor is used to collect information on surroundings of the vehicle for a predetermined time (for example, T seconds).

Next, in step S515, it is determined whether the vehicle is currently being driven in a straight line based on the collected information. Also in step S515, it may be determined whether a road on which the vehicle is being driven is a straight road.

Whether the vehicle is being driven in a straight line or the road on which the vehicle is being driven is a straight road may be determined as follows.

First, as illustrated in FIG. 6, if a time when a predetermined number of stopped objects 631 to 635 are present in front 620 of the vehicle 610 at regular intervals exceeds a predetermined time, in step S515, it is determined that the vehicle is being driven in a straight line or the road on which the vehicle is being driven is a straight road.

Second, if an absolute value ($|a_y|$) of the lateral acceleration which is transmitted from the G sensor is smaller than a reference value (a threshold of a lateral acceleration; $T_{lat}$), in step S520, it is determined that the vehicle is being driven in a straight line or the road on which the vehicle is being driven is a straight road.

Third, if an absolute value $|\delta_y|$ of the steering angle is smaller than a reference value (a threshold of a lateral acceleration; $T_{steer}$), in step S525, it is determined that the vehicle is being driven in a straight line or the road on which the vehicle is being driven is a straight road.

Steps S515 to S525 may be sequentially performed but the present invention is not limited thereto and at least one of steps S515 to S525 may be performed.

If it is determined that the vehicle is being driven in a straight line or the road on which the vehicle is being driven is a straight road, in step S530, it is determined whether the value of the yaw rate sensor is normal. In step S530, a value $\dot{\gamma}$ which is transmitted from the yaw rate sensor is compared with a value $\dot{\gamma}_{est}$ which is estimated by the following equation and if it is determined that the difference value those of is larger than the reference value (a threshold of a yaw rate value error $T_{error}$ a preparation process (S535) is performed and then the offset of the yaw rate sensor is corrected in step S570.

In the meantime, $\dot{\gamma}_{est}$ may be estimated by the following equation.

$$\dot{\gamma}_{est} = \frac{a_y}{v_x} \quad \text{[Equation 1]}$$

In the above equation, $a_y$ indicates a lateral acceleration and $v_x$ indicates a longitudinal speed.

2) when vehicle stops (vehicle speed=0)

In the status when the vehicle stops, a predetermined level of bias is basically present so that a biased amount of offset may be corrected.

However, when the vehicle is located on a structure which moves the stopped vehicle such as a turn table of a parking garage, even though the vehicle stops, a rotational force is generated. Therefore, when the biased amount of offset is corrected, an erroneous result value is corrected so that a fatal result which selects a vehicle which drives on a next lane during the driving may occur.

Therefore, in the exemplary embodiment, like the case when the vehicle is being driven, information on an object which is present around the vehicle is collected so that even when the vehicle stops, a case when the rotational force is generated is detected to prevent the erroneous correction.

First, in step S540, a radar sensor which is installed in the vehicle is used to collect information on the stopped object which is disposed around the vehicle and in step S545, it is determined whether the stopped object moves based on the collected information.

In a status when the vehicle is being driven, a relative velocity of the stopped object is generated by the speed of the vehicle but when the vehicle stops, the relative velocity of the stopped object is not generated. However, even though its own vehicle stops, if the relative velocity of the stopped object is generated, it is determined that its own vehicle is located on the structure which moves the stopped vehicle. In this case, the offset of the yaw rate sensor is not corrected.

As illustrated in FIG. 7, when the vehicle 710 is located on the structure 720 which rotates the stopped vehicle, such as a turn table, the stopped objects 731 to 733 around the vehicle have displacement values as the time has elapsed. As described above, if it is determined that a curvature is present around the vehicle, the correction of the offset is stopped and a stand-by status is maintained until the vehicle becomes a normal status.

In step S545, if it is determined that the stopped object does not move, it is determined that an absolute value $|a_y|$ of the lateral acceleration which is transmitted from the G sensor is smaller than a reference value (a threshold of lateral acceleration $T_{lat}$) in step S550.

If the absolute value of the lateral acceleration is smaller than the reference value, in step S555, it is determined whether an absolute value $|\delta_y|$ of a steering angle is smaller than a reference value (a threshold of steering angle $T_{steer}$).

If the absolute value of the steering angle is smaller than the reference value, in step S560, it is determined whether a value $\dot{\gamma}$ which is transmitted from the yaw rate sensor is larger than zero.

If the value which is transmitted from the yaw rate sensor, that is, a measurement value of the yaw rate sensor is larger than zero, the preparation process (step S565) is performed and then the offset of the yaw rate sensor is corrected in step S570.

In the meantime, steps S550 to S560 may be omitted. In this case, if it is determined that the stopped object does not move in step S545, the preparation process (step S565) is performed and then the offset of the yaw rate sensor is corrected in step S570.

The offset correcting method of the yaw rate sensor which has been described above may be summarized as follows. First, the current status determining unit determines the status of its own vehicle as one of a driving vehicle and a stopped vehicle.

If its own vehicle is determined as a driving vehicle, the first offset correcting unit corrects the offset of the yaw rate sensor which is installed in its own vehicle when its own vehicle is being driven in a straight line.

In contrast, if its own vehicle is determined as the stopped vehicle, the second offset correcting unit corrects the offset of the yaw rate sensor when the position of its own vehicle is not changed.

Figure 8:
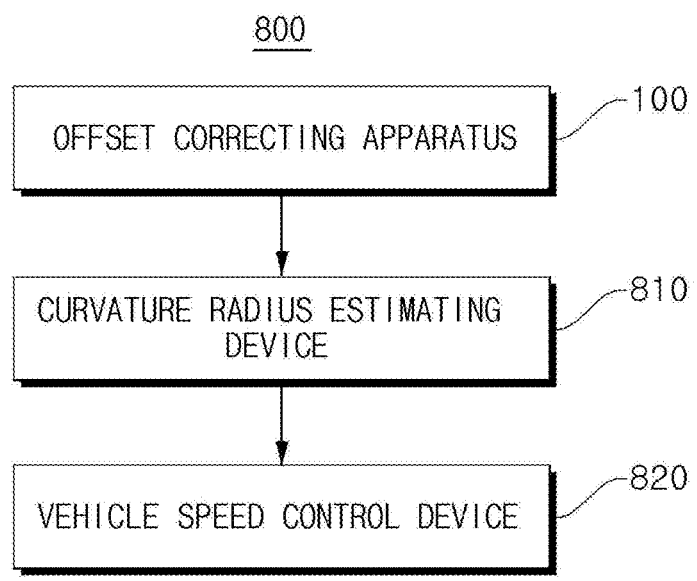
FIG. 8 is a block diagram schematically illustrating a vehicle speed control system according to an exemplary embodiment of the present invention.

Next, a vehicle speed control system which includes an offset correcting apparatus 100 of a yaw rate sensor will be described. FIG. 8 is a block diagram schematically illustrating a vehicle speed control system according to an exemplary embodiment of the present invention.

Referring to FIG. 8, the vehicle speed control system 800 includes an offset correcting apparatus 100, a curvature radius estimating device 810, and a vehicle speed control device 820. The vehicle speed control system 800 according to the exemplary embodiment may be implemented by a smart cruise control (SCC) system or an adaptive cruise control (ACC) system.

The offset correcting apparatus 100 has been described above with reference to FIGS. 1 to 7 so that a detailed description thereof will be omitted.

The curvature radius estimating device 810 estimates a radius of curvature of its own vehicle based on an offset of a yaw rate sensor. The curvature radius estimating device 810 may estimate the radius of curvature using a yaw rate value or estimate the radius of curvature using a yaw rate and a steering angle, or estimate the radius of curvature using the yaw rate, the steering angle, and a vehicle speed.

The vehicle speed control device 820 controls a speed of its own vehicle based on sensing information obtained from sensors which are installed in its own vehicle and the radius of curvature of its own vehicle.

Figure 9:
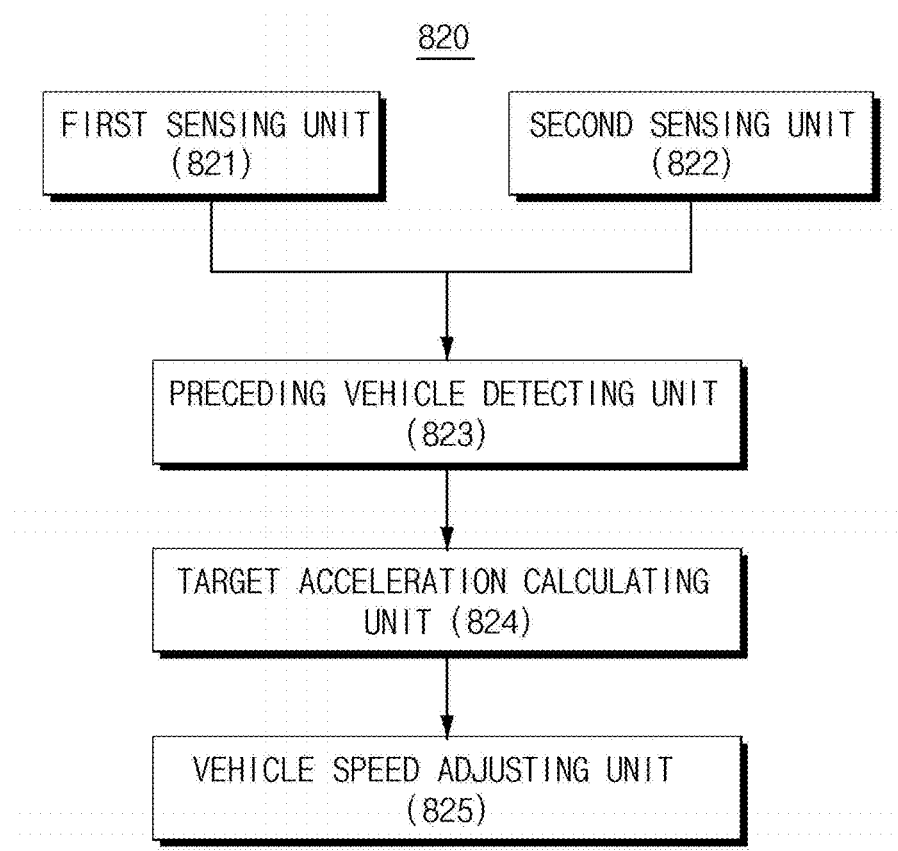
FIG. 9 is a block diagram illustrating a detailed configuration of a vehicle speed control device illustrated in FIG. 8.

The vehicle speed control device 820, as illustrated in FIG. 9, may include a first sensing unit 821, a second sensing unit 822, a preceding vehicle detecting unit 823, a target acceleration calculating unit 824, and a vehicle speed adjusting unit 825. FIG. 9 is a block diagram illustrating a detailed configuration of the vehicle speed control device illustrated in FIG. 8.

The first sensing unit 821 senses object information related with objects which are present around its own vehicle.

The second sensing unit 822 senses driving information related with the driving of its own vehicle such as a steering angle, a longitudinal acceleration, a lateral acceleration, and a yaw rate.

The preceding vehicle detecting unit 823 detects a preceding vehicle to be tracked by combining object information and driving information.

The target acceleration calculating unit 824 calculates a target acceleration based on a distance to the preceding vehicle and a speed of its own vehicle.

The vehicle speed adjusting unit 825 controls an accelerator and a decelerator of its own vehicle based on the target acceleration to adjust a speed of the vehicle. The vehicle speed adjusting unit 825 may be implemented by an actuator.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An offset correcting apparatus of a yaw rate sensor, comprising:
   a non-transitory computer-readable storage medium comprising:
   a current status determining unit which determines a status of its own vehicle as one of a driving vehicle and a stopped vehicle;
   a first offset correcting unit that determines whether its own vehicle is being driven in a straight line when its own vehicle is determined as the driving vehicle, and corrects an offset of a yaw rate sensor installed in its own vehicle when it is determined that its own vehicle is being driven in the straight line; and
   a second offset correcting unit that determines whether a position of its own vehicle has changed based on whether a distance between its own vehicle and a stopped object has changed when its own vehicle is determined as the stopped vehicle, and corrects the offset of the yaw rate sensor when it is determined that the position of its own vehicle has not changed; wherein the second offset correcting unit includes: a position change determining unit which determines whether a position of its own vehicle is changed for a predetermined time; and
   a second yaw rate offset correcting unit which if it is determined that the position of its own vehicle is not changed, corrects the offset of the yaw rate sensor based on a bias voltage which is applied to the equipment which is installed in its own vehicle;
   wherein the position change determining unit uses a radar sensor or an angular velocity sensor when determining whether the position of its own vehicle is changed; and
   wherein if the radar sensor is used to determine that the distance to a designated target which does not move is changed, the position change determining unit determines that the position of its own vehicle is changed or if the angular velocity sensor is used to determine that a position of equipment which is installed in its own vehicle is changed, the position change determining unit determines that the position of its own vehicle is changed.

2. The offset correcting apparatus of claim 1, wherein the first offset correcting unit includes:
   a straight drive determining unit which determines whether its own vehicle is being driven in a straight line using a sensor which is installed in its own vehicle;
   a yaw rate estimating unit which if it is determined that its own vehicle is being driven in a straight line, estimates a first yaw rate using a longitudinal speed of its own vehicle and a lateral acceleration of its own vehicle;
   a yaw rate measuring unit which if it is determined that its own vehicle is being driven in a straight line, measures a second yaw rate using the yaw rate sensor; and
   a first yaw rate offset correcting unit which corrects the offset of the yaw rate sensor using a difference value between the first yaw rate and the second yaw rate.

3. The offset correcting apparatus of claim 2, wherein the straight drive determining unit uses at least one selected from a radar sensor, a G sensor, and a steering angle sensor as a sensor which is installed in its own vehicle.

4. The offset correcting apparatus of claim 3, wherein if the radar sensor is used to determine that distances to stopped targets which are aligned in a driving direction of its own vehicle are constant, the straight drive determining unit determines that its own vehicle is being driven in a straight line, if it is determined that the absolute value of the lateral acceleration obtained using the G sensor is equal to or smaller than a first reference value, the straight drive determining unit determines that its own vehicle is being driven in a straight line, or if it is determined that a steering angle obtained using the steering angle sensor is equal to or smaller than a second reference value, the straight drive determining unit determines that its own vehicle is being driven in a straight line.

5. The offset correcting apparatus of claim 2, wherein if a difference value between the first yaw rate and the second yaw rate is equal to or larger than a third reference value, the first yaw rate offset correcting unit corrects the offset of the yaw rate sensor using the difference value between the first yaw rate and the second yaw rate.

6. The offset correcting apparatus of claim 1, wherein the current status determining unit includes:

a speed measuring unit which measures a speed of its own vehicle; and a speed utilizing unit which if the speed of its own vehicle is larger than zero, determines its own vehicle as the driving vehicle and if the speed of its own vehicle is zero, determine its own vehicle as the stopped vehicle.

7. An offset correcting method of a yaw rate sensor, comprising:

determining, using a current status determining unit of a non-transitory computer-readable storage medium, a status of its own vehicle as one of a driving vehicle and a stopped vehicle;

determining whether its own vehicle is being driven in a straight line when its own vehicle is determined as the driving vehicle, and correcting an offset of a yaw rate sensor installed in its own vehicle when it is determined that its own vehicle is being driven in the straight line; and determining whether a position of its own vehicle has changed based on whether a distance between its own vehicle and a stopped object has changed when its own vehicle is determined as the stopped vehicle, and correcting the offset of the yaw rate sensor when it is determined that the position of its own vehicle has not change; wherein the correcting of an offset when its own vehicle is determined as the driving vehicle includes: determining whether a position of its own vehicle is changed for a predetermined time; and correcting the offset of the yaw rate sensor based on a bias voltage which is applied to the equipment which is installed in its own vehicle if it is determined that the position of its own vehicle is not changed; and wherein the determining of whether a position of its own vehicle is changed uses a radar sensor or an angular velocity sensor when determining whether the position of its own vehicle is changed; and wherein the determining of whether a position of its own vehicle is changed includes: determining that the position of its own vehicle is changed if the radar sensor is used to determine that the distance to a designated target which does not move is changed, or determining that the position of its own vehicle is changed if the angular velocity sensor is used to determine that a position of equipment which is installed in its own vehicle is changed.

8. The offset correcting method of claim 7, wherein the correcting of an offset when its own vehicle is determined as the driving vehicle, includes:

determining whether its own vehicle is being driven in a straight line using a sensor which is installed in its own vehicle;

estimating a first yaw rate using a longitudinal speed of its own vehicle and a lateral acceleration of its own vehicle if it is determined that its own vehicle is being driven in a straight line;

measuring a second yaw rate using the yaw rate sensor if it is determined that its own vehicle is being driven in a straight line; and correcting the offset of the yaw rate sensor using a difference value between the first yaw rate and the second yaw rate.

9. The offset correcting method of claim 8, wherein the determining of whether its own vehicle is being driven in a straight line uses at least one selected from a radar sensor, a G sensor, and a steering angle sensor as a sensor which is installed in its own vehicle.

10. The offset correcting method of claim 9, wherein the determining of whether its own vehicle is being driven in a straight line includes:

determining that its own vehicle is being driven in a straight line if the radar sensor is used to determine that distances to stopped targets which are aligned in a driving direction of its own vehicle are constant, determining that its own vehicle is being driven in a straight line if it is determined that the absolute value of the lateral acceleration obtained using the G sensor is equal to or smaller than a first reference value, or determining that its own vehicle is being driven in a straight line if it is determined that a steering angle obtained using the steering angle sensor is equal to or smaller than a second reference value.

11. The offset correcting method of claim 8, wherein when a difference value between the first yaw rate and the second yaw rate is equal to or larger than a third reference value, the correcting using the difference value includes correcting the offset of the yaw rate sensor using the difference value between the first yaw rate and the second yaw rate.

12. The offset correcting method of claim 7, wherein the determining of a status of its own vehicle as one of a driving vehicle and a stopped vehicle includes:

measuring a speed of its own vehicle; and determining its own vehicle as the driving vehicle if the speed of its own vehicle is greater than zero, and determining its own vehicle as the stopped vehicle if the speed of its own vehicle is zero.

13. A vehicle speed control system, comprising:

an offset correcting apparatus which includes:

a current status determining unit which determines a status of its own vehicle as one of a driving vehicle and a stopped vehicle;

a first offset correcting unit that determines whether its own vehicle is being driven in a straight line when its own vehicle is determined as the driving vehicle, and corrects an offset of a yaw rate sensor installed in its own vehicle when it is determined that its own vehicle is being driven in the straight line;

a second offset correcting unit that determines whether a position of its own vehicle has changed based on whether a distance between its own vehicle and a stopped object has changed when its own vehicle is determined as the stopped vehicle, and corrects the offset of the yaw rate sensor when it is determined that the position of its own vehicle has not changed;
a curvature radius estimating device which estimates a radius of curvature of its own vehicle based on the offset of the yaw rate sensor; and
a vehicle speed control device which controls a speed of its own vehicle based on sensing information obtained from sensors which are installed in its own vehicle and the radius of curvature of its own vehicle; wherein the second offset correcting unit includes: a position change determining unit which determines whether a position of its own vehicle is changed for a predetermined time; and
a second yaw rate offset correcting unit which if it is determined that the position of its own vehicle is not changed, corrects the offset of the yaw rate sensor based on a bias voltage which is applied to the equipment which is installed in its own vehicle;
wherein the position change determining unit uses a radar sensor or an angular velocity sensor when determining whether the position of its own vehicle is changed; and
wherein if the radar sensor is used to determine that the distance to a designated target which does not move is changed, the position change determining unit determines that the position of its own vehicle is changed or if the angular velocity sensor is used to determine that a position of equipment which is installed in its own vehicle is changed, the position change determining unit determines that the position of its own vehicle is changed.

14. The vehicle speed control system of claim 13, wherein the vehicle speed control device includes:
a first sensing unit which senses object information related with objects which are present around its own vehicle;
a second sensing unit which senses driving information related with the driving of its own vehicle;
a preceding vehicle detecting unit which detects a preceding vehicle to follow by combining object information and driving information;
a target acceleration calculating unit which calculates a target acceleration based on a distance to the preceding vehicle and a speed of its own vehicle; and
a vehicle speed adjusting unit which controls an accelerator and a decelerator of its own vehicle based on the target acceleration to adjust a speed of its own vehicle.

* * * * *